United States Patent
Yu et al.

(10) Patent No.: US 10,867,020 B2
(45) Date of Patent: Dec. 15, 2020

(54) VOICEPRINT CERTIFICATION METHOD AND ELECTRONIC DEVICE THEREOF

(71) Applicant: Far EasTone Telecommunications Co., Ltd., Taipei (TW)

(72) Inventors: Wen-Shien Yu, Taipei (TW); Shih-Kai Shen, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 238 days.

(21) Appl. No.: 16/012,764

(22) Filed: Jun. 20, 2018

(65) Prior Publication Data

US 2019/0228138 A1     Jul. 25, 2019

(30) Foreign Application Priority Data

Jan. 19, 2018   (TW) .............................. 107102128 A

(51) Int. Cl.
   *G06F 21/32* (2013.01)
   *G10L 17/06* (2013.01)
   *G10L 17/24* (2013.01)

(52) U.S. Cl.
   CPC .............. *G06F 21/32* (2013.01); *G10L 17/06* (2013.01); *G10L 17/24* (2013.01)

(58) Field of Classification Search
   CPC ......... G06F 21/32; G10L 17/06; G10L 17/24; H04L 9/3231; H04L 29/6809; H04L 63/0861
   See application file for complete search history.

(56) References Cited

U.S. PATENT DOCUMENTS

| | | | | |
|---|---|---|---|---|
| 7,106,845 B1 * | 9/2006 | Zhuk | ...................... | G06F 21/31 379/189 |
| 8,116,436 B2 | 2/2012 | Isenberg | | |
| 8,613,066 B1 * | 12/2013 | Brezinski | ................ | G06F 21/32 726/7 |
| 9,286,899 B1 * | 3/2016 | Narayanan | .............. | G10L 17/24 |

(Continued)

FOREIGN PATENT DOCUMENTS

| | | |
|---|---|---|
| TW | I292572 | 1/2008 |
| TW | 201530535 | 8/2015 |

(Continued)

*Primary Examiner* — Kristine L Kincaid
*Assistant Examiner* — Alexander R Lapian
(74) *Attorney, Agent, or Firm* — JCIPRNET

(57) ABSTRACT

A voiceprint certification method is provided. The method is applicable to an electronic device which records a plurality pieces of user information and a plurality of voiceprints of a plurality of verification words corresponding to each piece of user information. The method includes: receiving first user information among the plurality pieces of user information; selecting at least one first verification word from the verification words corresponding to the first user information and generating a random verification sentence including the at least one first verification word, to prompt a user to read the random verification sentence; and certifying the user by comparing a user input sentence with the random verification sentence and by determining whether a voiceprint corresponding to the first verification word in the user input sentence matches the voiceprint of the first verification word corresponding to the first user information recorded in the electronic device.

10 Claims, 4 Drawing Sheets

(56) References Cited

U.S. PATENT DOCUMENTS

| | | | | |
|---|---|---|---|---|
| 2012/0253809 A1* | 10/2012 | Thomas | ............... | G10L 17/24 |
| | | | | 704/246 |
| 2013/0305355 A1* | 11/2013 | Wang | ................. | G06F 21/31 |
| | | | | 726/19 |
| 2014/0013405 A1* | 1/2014 | White | ................. | H04L 63/10 |
| | | | | 726/5 |
| 2018/0232591 A1* | 8/2018 | Hicks | ............. | G06K 9/00288 |
| 2020/0151601 A1* | 5/2020 | Niewczas | ........... | H04L 67/20 |

FOREIGN PATENT DOCUMENTS

| | | |
|---|---|---|
| TW | I592820 | 7/2017 |
| TW | I605223 | 11/2017 |

* cited by examiner

VOICEPRINT CERTIFICATION METHOD AND ELECTRONIC DEVICE THEREOF

CROSS-REFERENCE TO RELATED APPLICATION

This application claims the priority benefit of Taiwan application serial no. 107102128, filed on Jan. 19, 2018. The entirety of the above-mentioned patent application is hereby incorporated by reference herein and made a part of this specification.

BACKGROUND OF THE INVENTION

Field of the Invention

The invention relates to a certification method, particularly to a voiceprint certification method and an electronic device thereof.

Description of Related Art

In modern life, demands for using biological or behavioral features in identification and identity certification has been gradually increasing. For example, the auto-pass service is currently adopted at most of the airports. The auto-pass service does not require customs officers to process complex procedures but can allow users to rapidly pass the customs using facial or fingerprint identification.

All kinds of biological features used in identification, however, can possibly be hacked or forged. Users thus often raise concerns about the security issue of such newly-emerged technology. Taking facial identification as an example, forgers might use photos or three-dimensional printing models to pass facial certification. Taking voiceprint identification as an example, forgers might illegally record a voice of the user passing voiceprint certification to pass voiceprint certification. Hence, people skilled in the art must devote to enhance the security for biological identification or certification if the identification or certification using biological features is expected to entirely replace that using human resources or passwords.

SUMMARY OF THE INVENTION

In view of the above, the invention provides a voiceprint certification method and an electronic device thereof, such that the security of voiceprint certification is enhanced.

The invention provides a voiceprint certification method applicable to an electronic device. The electronic device records a plurality pieces of user information and a plurality of voiceprints of a plurality of verification words corresponding to each of the plurality pieces of user information. The voiceprint certification method in one exemplary embodiment is provided hereinafter. First user information among the plurality pieces of user information is received. At least one first verification word is selected from the plurality of verification words corresponding to the piece of first user information and a random verification sentence including the at least one first verification word is generated, such that a user is prompted to read the random verification sentence. The user is certified through a user input sentence being compared with the random verification sentence and through whether at least one voiceprint corresponding to the at least one first verification word in the user input sentence matches at least one voiceprint of the at least one first verification word corresponding to the first user information recorded in the electronic device is determined.

The invention provides an electronic device including a database, a communication element, and a processor coupled to the database and the communication element. The database is configured to record a plurality pieces of user information and a plurality of voiceprints of a plurality of verification words corresponding to each of the plurality pieces of user information. The communication element is configured to communicate with an external device. The processor is configured to receive first user information from the external device via the communication element, select at least one first verification word among the plurality of verification words corresponding to the piece of first user information from the database and generate a random verification sentence including the at least one first verification word, to prompt a user to read the random verification sentence via the communication element, and certify the user by comparing a user input sentence from the external device with the random verification sentence and by determining whether at least one voiceprint corresponding to the at least one first verification word in the user input sentence matches at least one voiceprint of the at least one first verification word corresponding to the first user information recorded in the database.

The invention provides an electronic device including a database, an input/output element, and a processor coupled to the database and the input/output element. The database is configured to record a plurality pieces of user information and a plurality of voiceprints of a plurality of verification words corresponding to each of the plurality pieces of user information. The input/output element is configured to input and output signals. The processor is configured to receive first user information among the plurality pieces user information via the input/output element, select at least one first verification word from the plurality of verification words corresponding to the piece of first user information from the database and generate a random verification sentence including the at least one first verification word, to prompt a user to read the random verification sentence via the input/output element, and certify the user by comparing a user input sentence from the input/output element with the random verification sentence and by determining whether at least one voiceprint corresponding to the at least one first verification word in the user input sentence matches at least one voiceprint of the at least one first verification word corresponding to the first user information recorded in the database.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
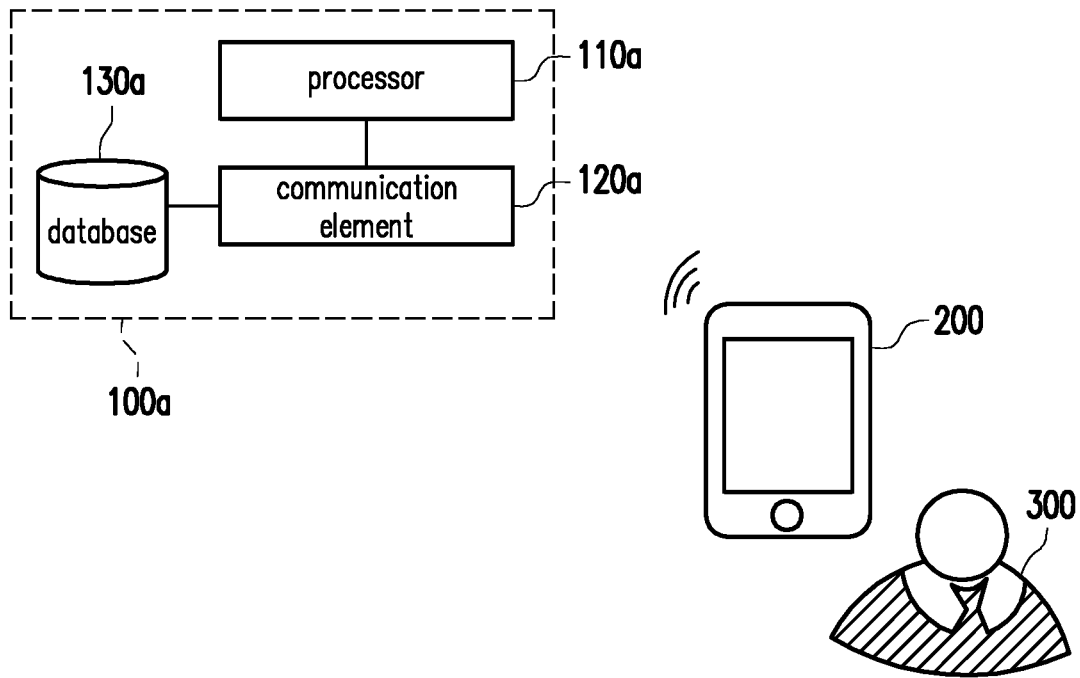
FIG. 1 and FIG. 2 are block diagrams illustrating an electronic device in some embodiments of the invention.
Figure 2:
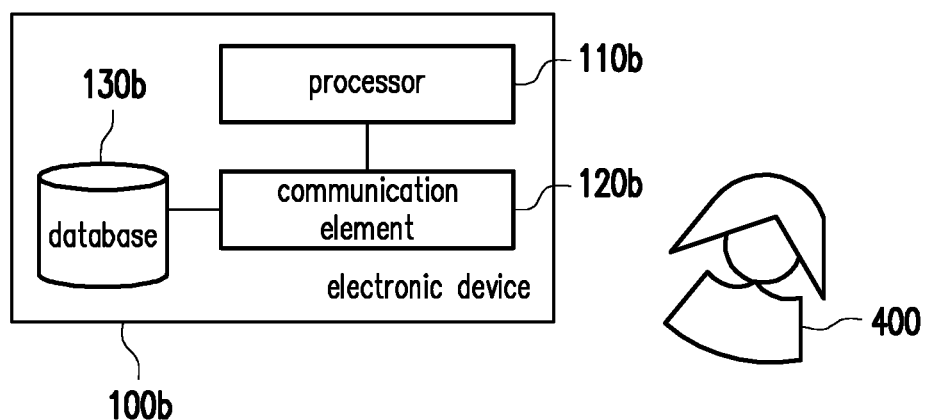

FIG. 1 and FIG. 2 are block diagrams illustrating an electronic device in some embodiments of the invention.

The voiceprint certification method of the invention may be executed with use of an electronic device 100a of FIG. 1 or an electronic device 100b of FIG. 2. It should be explained that the invention is not limited to the above. People having ordinary skills in the art may also employ the voiceprint certification method introduced in the disclosed embodiments of the invention with use of other devices or systems.

Referring to FIG. 1, the electronic device 100a includes a processor 110a, a communication element 120a, and a database 130a. The processor 110a is coupled to the communication element 120a and the database 130a. In some embodiments, the electronic device 100a provides a voiceprint certification service. With the voiceprint certification method in the disclosed embodiments of the invention, a user 300 of an electronic device 200 (for example but not limited to: a mobile device) is certified with use of voiceprint through the mobile device 200 being connected to the electronic device 100a, and the electronic device 100a may decide whether the user 300 passes certification. In other embodiments, the electronic device 200 may also be a device such as a personal computer, a personal digital assistant, a server, etc. The invention is not limited to the above.

More specifically, the processor 110a may be, for example, a central processing unit (CPU) of dual-core, quad-core, octo-core, or of other types, a system-on-chip (SOC), an application processor, a media processor, a microprocessor, a digital signal processor, or other similar devices. Types of processors used in actual situations are not limited in the disclosure. In some embodiments, the processor 110a is configured to control the overall operation of the electronic device 100a.

The communication element 120a is, for example but not limited to, one of communication modules such as a wired universal serial bus (USB), Bluetooth, radio frequency (RF), and wireless fidelity (Wi-Fi), or a combination thereof. The communication element 120a is configured to communicate with the electronic device 200 in a wired or wireless way.

An embodiment of the database 130a is, for example but not limited to, a hard disk used to store data or a non-volatile memory. The database 130a is configured to record a plurality pieces of user information and a plurality of voiceprints of a plurality of verification words corresponding to each of the plurality pieces of user information. Detailed examples on the data recorded by the database 130a are provided in the embodiments in the following paragraphs.

It should be noted that the processor 110a, the communication element 120a, and the database 130a are employed as a whole in some embodiments. In some other embodiments, the processor 110a and the communication element 120a are employed as a whole, while the processor 110a is coupled to an external database 130a via the communication element 120a.

Referring to FIG. 2, the electronic device 100b includes a processor 110b, an input/output element 120b, and a database 130b. The processor 110b is coupled to the input/output element 120b and the database 130b. In some embodiments, the electronic device 100b provides a voiceprint certification service. With the voiceprint certification method in the disclosed embodiments of the invention, a user 400 of the electronic device 100b is certified with use of voiceprint through the input/output element 120b, and the electronic device 100b may decide whether the user 400 passes certification.

Similar to the processor 110a of the electronic device 100a, the processor 110b may be, for example, a central processing unit (CPU) of dual-core, quad-core, octo-core, or of other types, a system-on-chip (SOC), an application processor, a media processor, a microprocessor, a digital signal processor, or other similar devices. Types of processors used in actual situations are not limited by the disclosed embodiments of the invention. In some embodiments, the processor 110b is configured to control the overall operation of the electronic device 100b.

The input/output element 120b includes an input element and an output element. The input element includes an audio-signal input device (e.g. a microphone) and is configured to obtain voice input signals. Nevertheless, the invention is not limited to the above. Besides the audio-signal input device, the input element may further include one of input devices such as a touch screen, a keyboard, a mouse, a microphone, and a camera, or a combination thereof. The invention is not limited to the above. On the other hand, the output element is, for example but not limited to, one of output devices such as a non-touch screen, a touch screen, and a speaker, or a combination thereof. The output element may be used to prompt a user to perform operations.

Similar to the database 130a of the electronic device 100a, an embodiment of the database 130b is, for example but not limited to, a hard disk used to store data or a non-volatile memory. The database 130b is configured to record a plurality pieces of user information and a plurality of voiceprints of a plurality of verification words corresponding to each of the plurality pieces of user information. Detailed examples on the data recorded by the database 130b are provided in the embodiments in the following paragraphs.

FIG. 3 to FIG. 7 are flowcharts illustrating a voiceprint certification method in some embodiments of the invention. In the embodiments of the invention, the voiceprint certification method may, for example, include one of "registration", "certification", and "extension", or a combination thereof. Processes of each part are explained in the following. Additionally, following explanations are given using elements in the electronic device 100a in the embodiment of FIG. 1 and in the electronic device 100b in the embodiment of FIG. 2 as examples. Identical elements are not repeatedly described hereinafter. The voiceprint certification method introduced in the disclosed embodiments of the invention, however, is not limited to being applied in the electronic device 100a and the electronic device 100b.

It should be explained that the terms "word" and "words" used in the text refer to, for example, one or more meaningful single words or phrases such as verbs, nouns, adjectives, etc. The terms "sentence" and "sentences" in the text refer to, for example, one or more sentences including at least a verb and an object. In some embodiments, meaning contained in a "sentence" may be logical or illogical. The invention is not limited to the above.

<<Registration>>

In some embodiments, a voiceprint of a user must be pre-recorded for later certification uses when the user enters or registers for a device or a system providing the voiceprint certification service. A random mechanism may effectively prevent hacking or forgery when voiceprints are being pre-recorded. In some embodiments, the registration may be performed in step S100.

Figure 3:
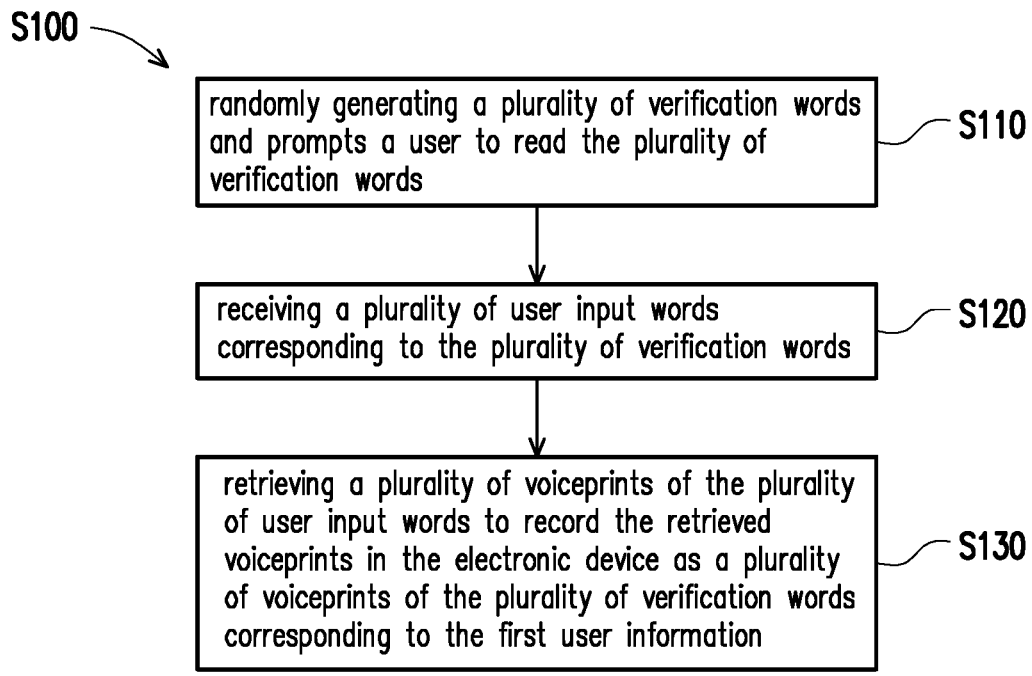
FIG. 3 to FIG. 7 are flowcharts illustrating a voiceprint certification method in some embodiments of the invention.

Referring to FIG. 3, in step S110, an electronic device randomly generates a plurality of verification words and prompts a user to read the plurality of verification words. In step S120, the electronic device receives a plurality of user input words corresponding to the plurality of verification words. At last, in step S130, the electronic device retrieves a plurality of voiceprints of the plurality of user input words, and records the plurality of voiceprints in the electronic device as the plurality of voiceprints of the plurality of verification words corresponding to the user information of the user.

For example, a piece of user information (e.g. a user account, an ID number, an e-mail address, etc.) is first set when a user enters or registers to serve as a code used to identify different users. Later, the electronic device, for example, randomly generates a set of verification words "apple tree" with regard to the piece of user information (e.g. first user information ID1) corresponding to the user and prompts the user to read "apple tree" (S110). In response to such prompt, the user, for example, reads a set of user input words "apple tree" and the set of user input words "apple tree" is received by the electronic device (S120). Last, the electronic device retrieves voiceprints of the set of user input words "apple tree", and records the retrieved voiceprints in the electronic device as voiceprints of the set of verification words "apple tree" corresponding to the first user information ID1 (S130). Then, the electronic device, for example, randomly generates another set of verification words "grape juice" and prompts the user to read "grape juice" (S110). In response to such prompt, the user, for example, reads a set of user input words "grape juice" and the set of user input words "grape juice" is received by the electronic device (S120). Last, the electronic device retrieves voiceprints of the set of user input words "grape juice", and records the retrieved voiceprints in the electronic device as voiceprints of the set of verification words "grape juice" corresponding to the first user information ID1 (S130). Similar steps as above are repeated and the electronic device records a plurality of voiceprints of the plurality of verification words corresponding to the first user information ID1 as shown in Table 1 below.

TABLE 1

| User information | Verification word(s) | Voiceprint(s) |
|---|---|---|
| ID1 | apple tree | voiceprints 1-1 |
| ID1 | grape juice | voiceprints 1-2 |
| . | . | . |
| . | . | . |
| . | . | . |
| ID1 | | |
| ID2 | orange juice | voiceprints 2-1 |
| . | . | . |
| . | . | . |
| . | . | . |
| ID2 | | |

On the other hand, other users may also enter or register using a method similar to the method above. As a result, the electronic device may record a plurality pieces of user information (e.g. first user information ID1, second user information ID2, etc.) and a plurality voiceprints of a plurality of verification words corresponding to each of the plurality pieces of user information.

In some embodiments, the processor 110a of the electronic device 100a, for example, randomly generates two or more verification words and is connected to the mobile device 200 via the communication element 120a, in order to prompt the user 300 to read the two or more verification words generated by the processor 110a through the mobile device 200 (S110). The user 300, for example, inputs a plurality of user input words corresponding to the two or more verification words via the mobile device 200. The electronic device 100a receives the plurality of user input words from the mobile device 200 via the communication element 120a (S120), and retrieves a plurality of voiceprints of the plurality of user input words and records the retrieved plurality of voiceprints in the database 130a as a plurality of voiceprints of the two or more verification words corresponding to the user information of the user 300 as shown in Table 1 above.

In other embodiments, after the user 300 inputs the plurality of user input words corresponding to the two or more verification words through the mobile device 200, the mobile device 200 may retrieve the plurality of voiceprints of the plurality of user input words and transmit the plurality of voiceprints retrieved to the electronic device 100a. In other words, the invention does not limit the functions of each element as long as a plurality of voiceprints of a plurality of verification words corresponding to each user information are recorded in the database 130a.

In some embodiments, the processor 110b of the electronic device 100b, for example, randomly generates two or more verification words and prompts the user 400 to read the two or more verification words generated by the processor 110b via the input/output element 120b (for example but not limited to: a display screen or a speaker) (S110). The user 400, for example, inputs a plurality of user input words corresponding to the two or more verification words via the input/output element 120b (e.g. a microphone). The electronic device 100b receives the plurality of user input words via the input/output element 120b (e.g. a microphone) (S120), retrieves a plurality of voiceprints of the plurality of user input words and records the retrieved plurality of voiceprints in the database 130b as a plurality of voiceprints of the two or more verification words corresponding to the user information of the user 400 as shown in Table 1 above.

It should be noted that verification words generated in the disclosed embodiments of the invention are not fixed but are random, so as to prevent a third party from pre-recording an audio of certain users reading certain word or words on the side. The security of voiceprint certification may thus be enhanced.

It should be noted that the invention does not limit the approaches taken for an electronic device to randomly generate one or more verification words. People having ordinary skills in the art may choose their own approaches according to their actual needs or skills.

<<Certification>>

In some embodiments, an ID certification of a user may be performed using a voiceprint certification service provided by an electronic device. In some embodiments, such certification may be performed in step S200.

Figure 4:
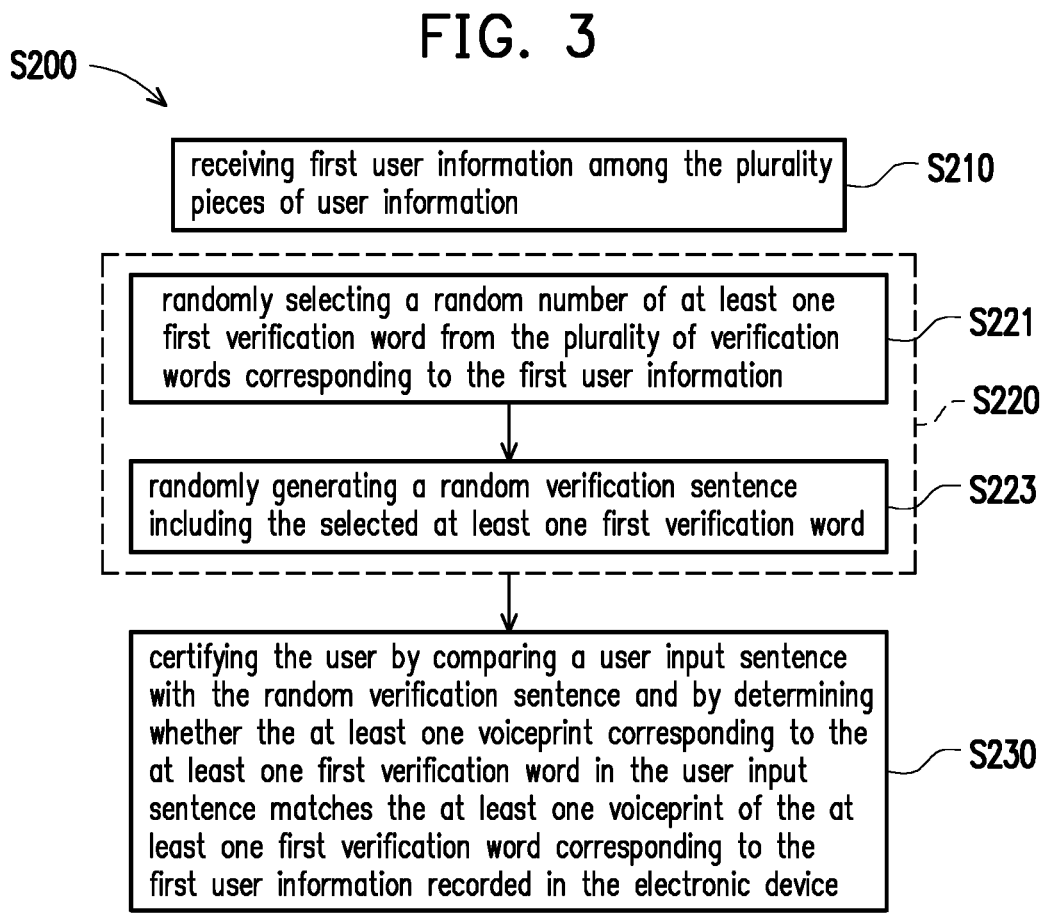

Referring to FIG. 4, in step S210, an electronic device receives first user information among a plurality pieces of user information. In step S220, the electronic device selects at least one first verification word from a plurality of verification words corresponding to the first user information and generates a random verification sentence including the at least one first verification word, to prompt a user to read the random verification sentence. In some embodiments, the step S220 further includes step S221 and step S223. In the step S221, the electronic device first randomly selects a random number of first verification words from the plurality of verification words corresponding to the first user information. In step S223, the electronic device then randomly generates a random verification sentence including the selected first verification words and prompts a user to read the random verification sentence. Later, in step S230, the electronic device certifies a user by comparing a user input sentence with the random verification sentence and by determining whether at least one voiceprint corresponding to the at least one first verification word in the user input sentence matches at least one voiceprint of the at least one first verification word corresponding to the first user information recorded in the electronic device.

Taking Table 1 above as an example, when a user is being certified, a piece of user information (e.g. a user account, an ID number, an e-mail address, etc.) provided during registration is used for certification. Hence, the piece of user information should be one of the plurality pieces of user information recorded in the database. Hypothetically, the user inputs the first user information ID1, the electronic device selects a random number (e.g. two) of at least one first verification word (e.g. apple tree) from a plurality verification words, such as apple tree, grape juice, etc., corresponding to the first user information ID1 (S221) after receiving the first user information ID1 (S210). Later, the electronic device randomly generates a random verification sentence including "apple tree" (e.g. "Washington chopped down a cherry tree instead of an apple tree.") according to the at least one first verification word "apple tree" selected (S223), to prompt the user to read the random verification sentence. In response to such prompt, the user, for example, reads out a user input sentence. After receiving the user input sentence, the electronic device certifies the user by determining whether the user input sentence is identical to the random verification sentence "Washington chopped down a cherry tree instead of an apple tree" and by determining whether voiceprints corresponding to "apple tree" in the user input sentence match voiceprints of "apple tree" corresponding to the first user information ID1 recorded in the electronic device (S230).

In some embodiments, the user 300, for example, inputs the first user information ID1 via the mobile device 200. After the electronic device 100a receives the first user information ID1 via the communication element 120a (S210), the processor 110a, for example, randomly selects a random number of at least one first verification word (e.g. apple tree) from the plurality of verification words corresponding to the first user information ID1 recorded in the database 130a (S221) and randomly generates a random verification sentence (e.g. "Washington chopped down a cherry tree instead of an apple tree.") according to the at least one first verification word selected (S223). Then, the processor 110a prompts the user 300 to read the random verification sentence via the mobile device 200 by sending the random verification sentence back to the mobile device 200 via the communication element 120a. Later, the user 300, for example, reads a user input sentence via a microphone of the mobile device 200. After the electronic device 100a receives the user input sentence, the processor 110a certifies the user by comparing the user input sentence with the random verification sentence and by determining whether at least one voiceprint corresponding to the at least one first verification word in the user input sentence matches at least one voiceprint of the at least one first verification word corresponding to the first user information ID1 recorded in the database 130a (S230).

In some embodiments, the user 400, for example, inputs the first user information ID1 via the input/output element 120b (e.g. a keyboard or a microphone) of the electronic device 100b. After the electronic device 100b receives the first user information ID1 via the input/output element 120b (S210), the processor 110b, for example, randomly selects a random number of at least one first verification word (e.g. apple tree) from the plurality of verification words corresponding to the first user information ID1 recorded in the database 130b (S221) and randomly generates a random verification sentence (e.g. "Washington chopped down a cherry tree instead of an apple tree") according to the at least one first verification word selected (S223). Then, the processor 110b prompts the user 400 to read the random verification sentence via the input/output element 120b (e.g. a display screen or a microphone). Later, the user 400 reads a user input sentence via the input/output element 120b (e.g. a microphone). After the electronic device 100b receives the user input sentence, the processor 110b certifies the user by comparing the user input sentence with the random verification sentence and by determining whether at least one voiceprint corresponding to the at least one first verification word in the user input sentence matches at least one voiceprint of the at least one first verification word corresponding to the first user information ID1 recorded in the database 130b (S230).

More specifically, the step S230 performed by the processor 110a or the processor 110b further includes step S231 and step S233. The invention does not limit the order of the step S231 and the step S233.

Figure 5:
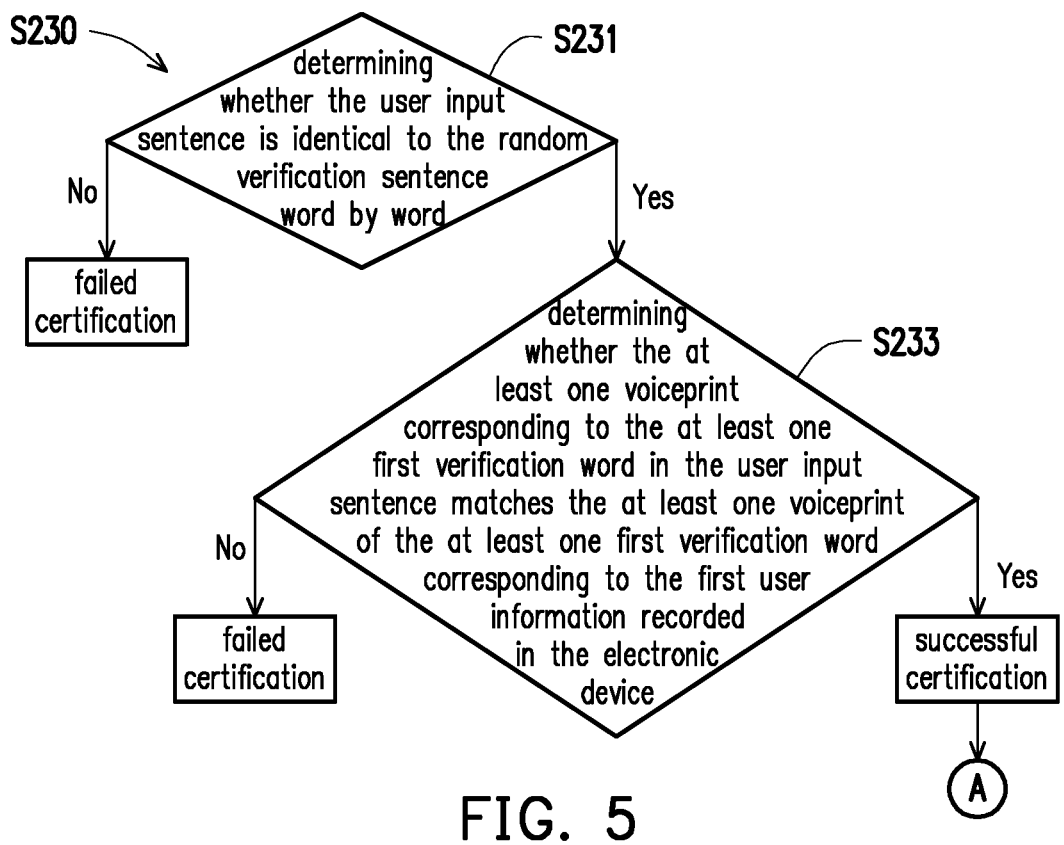

Referring to FIG. 5, the step S231 is performed before the step S233 in the embodiment of FIG. 5. In the step S231, the processor 110a or the processor 110b first determines whether the user input sentence is identical to the random verification sentence word by word. If identical, the step S233 is then performed. If not identical, the processor 110a or the processor 110b determines a failed certification of the user. In the step S233, the processor 110a or the processor 110b determines whether at least one voiceprint corresponding to the at least one first verification word selected earlier in the user input sentence matches at least one voiceprint of the at least one first verification word corresponding to the first user information recorded in the electronic device. If they match, the processor 110a or the processor 110b determines a successful certification of the user. If they do not match, the processor 110a or the processor 110b determines a failed certification of the user.

For example, the random verification sentence generated is "Washington chopped down a cherry tree instead of an apple tree", wherein the "apple tree" is a set of first verification words earlier selected corresponding to the first user information ID1. The processor 110a or the processor 110b first employs a speech to text (STT) conversion software to convert the user input sentence into words, and compares whether the words converted from the user input sentence are identical to "Washington chopped down a cherry tree instead of an apple tree" word by word (S231). If identical, the processor 110a or the processor 110b determines whether voiceprints corresponding to "apple tree" in the user input sentence "Washington chopped down a cherry tree instead of an apple tree" match voiceprints of "apple tree" corresponding to the first user information ID1 recorded in the electronic device (S233). If they match, a successful certification of the user is determined.

Figure 6:
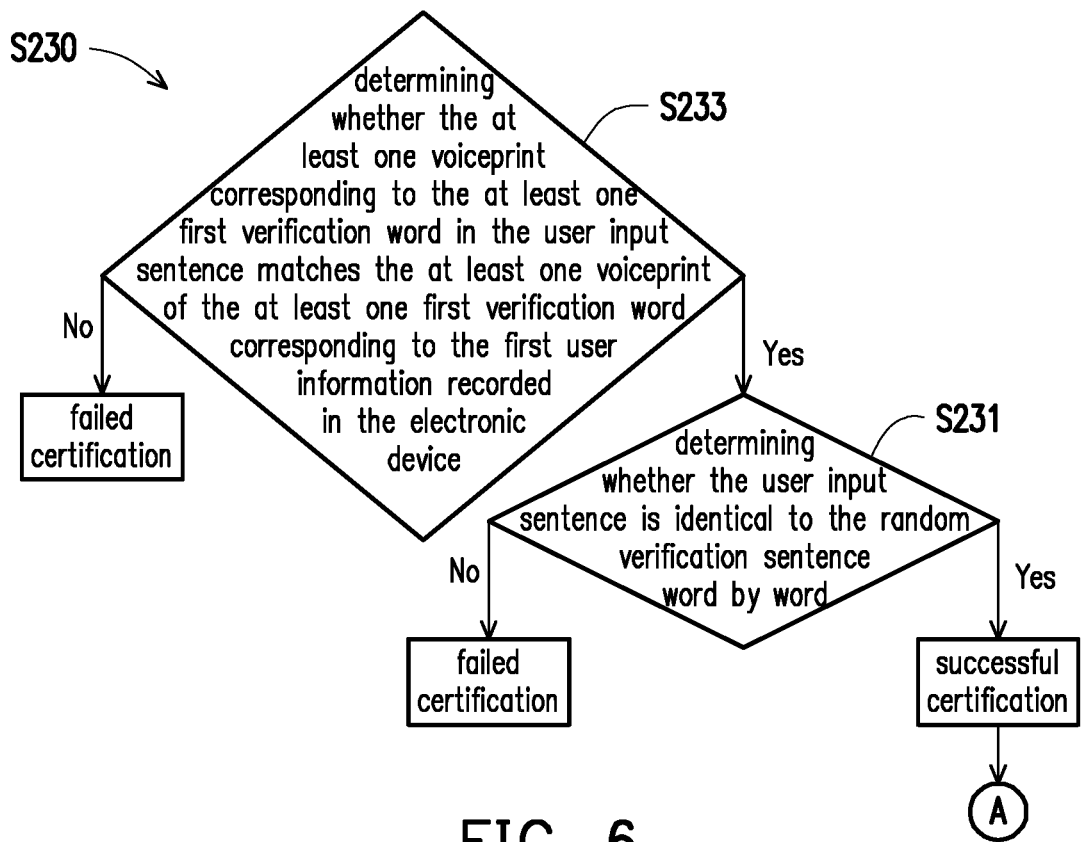

Referring to FIG. 6, the step S233 is performed before the step S231 in the embodiment of FIG. 6. In the step S233, the processor 110a or the processor 110b determines whether at least one voiceprint corresponding to the earlier selected at least one first verification word in the user input sentence matches at least one voiceprint of the at least one first verification word corresponding to the first user information ID1 recorded in the electronic device. If they match, the step S231 is the performed. If they do not match, the processor 110a or the processor 110b determines a failed certification of the user. In the step S231, the processor 110a or the processor 110b first determines whether the user input sentence is identical to the random verification sentence word by word. If identical, the processor 110a or the processor 110b determines a successful certification of the user. If not identical, the processor 110a or the processor 110b determines a failed certification of the user.

For example, the random verification sentence generated is "Washington chopped down a cherry tree instead of an apple tree", wherein the "apple tree" is a set of first verification words earlier selected corresponding to the first user information ID1. The processor 110a or the processor 110b, for example, first compares all voiceprints of the user input sentence and determines whether voiceprints of "apple tree" corresponding to the first user information ID1 are identified in the voiceprints (S233). If identified, the processor 110a or the processor 110b may further employ the speech to text conversion software to convert the user input sentence into words, and compare whether the words converted from the user input sentence are identical to "Washington chopped down a cherry tree instead of an apple tree" word by word (S231). If identical, a successful certification of the user is determined.

It should be noted that the set of first verification words "apple tree" is used as an example for the at least one first verification randomly selected in the aforementioned embodiment. The invention is not limited to the above. In other embodiments, a number of the at least one first verification word selected may also randomly be one, three, four, or more.

It should be noted that the invention does not limit the approaches taken for an electronic device to randomly select at least one first verification word and randomly generate a random verification sentence including the at least one first verification word. People having ordinary skills in the art may choose their own approaches according to their actual needs or skills.

<<Extension>>

In some embodiments, the voiceprint certification service provided by an electronic device has learning ability. More specifically, a number of the plurality of verification words corresponding to each of the plurality pieces of user information recorded in the database may increase as successful certifications of users are determined. Particularly, the security of the voiceprint certification method of the invention is enhanced as a number of the plurality of verification words corresponding to the plurality pieces of use information increases. In some embodiments, the augmentation may be performed in step S300.

Figure 7:
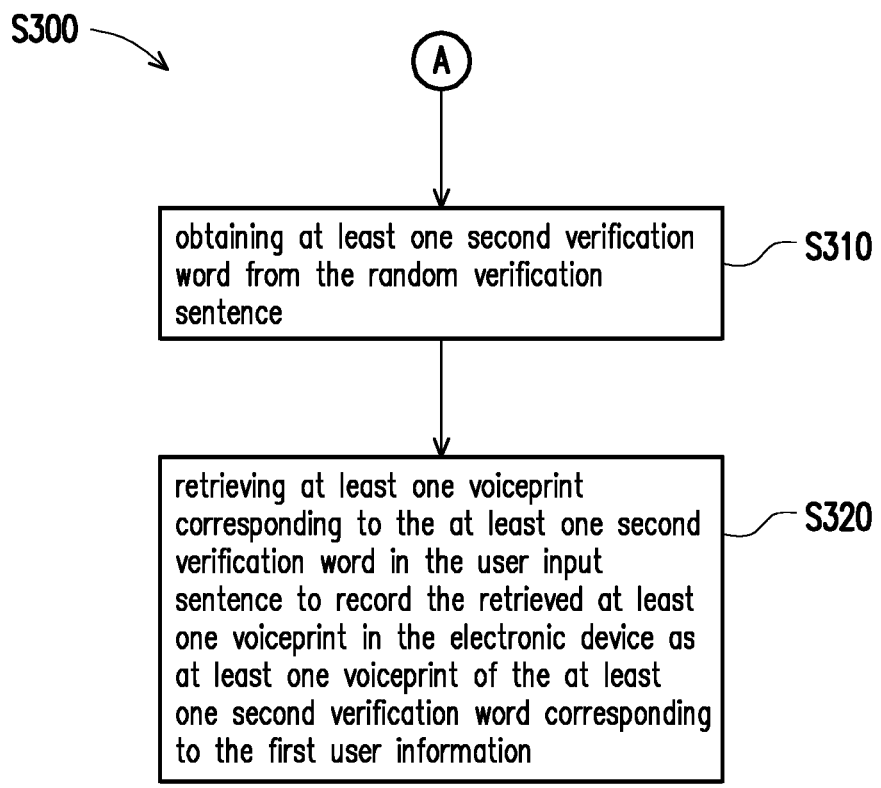

Referring to FIG. 7, in step S310 after a successful certification is determined, the processor 110a or the processor 110b obtains at least one second verification word from the random verification sentence. In a step S320, the processor 110a or the processor 110b retrieves at least one voiceprint corresponding to the at least one second verification word in a user input sentence to record the retrieved at least one voiceprint in the database 130a or 130b as at least one voiceprint of the at least one second verification word corresponding to the first user information.

For example, the random verification sentence generated is "Washington chopped down a cherry tree instead of an apple tree", wherein the "apple tree" is a set of first verification words earlier selected corresponding to the first user information ID1. After a successful certification of the user is determined, the processor of the electronic device, for example, randomly obtains a second verification word "Washington" and another set of second verification words "cherry tree" from the random verification sentence "Washington chopped down a cherry tree instead of an apple tree" (S310). Since the user input sentence used when the successful certification of the user is determined absolutely includes parts corresponding to the second verification word "Washington" and the set of second verification words "cherry tree", the electronic device may thus retrieve voiceprints corresponding to the second verification word "Washington" and the set of second verification words "cherry tree" from the user input sentence and record the retrieved voiceprints in the database connected to the electronic device as voiceprints corresponding to the second verification word "Washington" and the set of second verification words "cherry tree" corresponding to the first user information ID1 (S320) as shown in Table 2 below.

TABLE 2

| User information | Verification word(s) | Voiceprint(s) |
|---|---|---|
| ID1 | apple tree | voiceprints 1-1 |
| ID1 | grape juice | voiceprints 1-2 |
| ID1 | Washington | voiceprints 1-3 |
| ID1 | cherry tree | voiceprints 1-4 |
| . | . | . |
| . | . | . |
| . | . | . |
| ID1 | | |
| ID2 | orange juice | voiceprints 2-1 |
| . | . | . |
| . | . | . |
| . | . | . |
| ID2 | | |

In some embodiments, the at least one second verification word retrieved is different from the at least one first verification word. In some embodiment, the at least one second verification word retrieved corresponding to a certain piece user information and a plurality of verification words corresponding to the certain piece of user information recorded in the database do not overlap.

It should be noted that the invention does not limit the approaches taken to obtain one or more second verification words from the random verification sentence. People having ordinary skills in the art may choose their own approaches according to their actual needs and skills.

In some embodiments, when a number of a certain verification word corresponding to a piece of use information being randomly selected and leading to successful certifications of the user reaches a pre-determined number, the certain verification word corresponding to the piece of user information is removed from the database for security purpose. For example, when a number of the "apple tree" corresponding to the first user information ID1 being selected and leading to successful certifications of the user reaches a pre-determined number (e.g. 5), the processor 110a or the processor 110b removes "apple tree" from the verification words corresponding to the first user information ID1 as shown in Table 3 below.

TABLE 3

| User information | Verification word(s) | Voiceprint(s) |
|---|---|---|
| ID1 | grape juice | voiceprints 1-2 |
| ID1 | Washington | voiceprints 1-3 |
| ID1 | cherry tree | voiceprints 1-4 |
| . | . | . |
| . | . | . |
| . | . | . |
| ID1 | | |
| ID2 | orange juice | voiceprints 2-1 |

TABLE 3-continued

| User information | Verification word(s) | Voiceprint(s) |
|---|---|---|
| | . | . |
| | . | . |
| | . | . |
| ID2 | | |

Based on the above, the voiceprint certification method and the electronic device thereof provided in the invention certify a user by generating a random verification sentence including at least one verification word randomly selected, comparing a user input sentence with the random verification sentence, and determining whether at least one voiceprint corresponding to the at least one verification word in the user input sentence matches at least one voiceprint pre-recorded in the database. Moreover, the voiceprint certification method and the electronic device thereof further has learning ability and may retrieve voiceprints of other words in the random verification sentence after a successful certification of the user is determined to augment the database. As a result, the security for voiceprint certification is enhanced.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A voiceprint certification method applicable to an electronic device, wherein the electronic device records a plurality of pieces of user information and a plurality of voiceprints of a plurality of verification words corresponding to each of the plurality of pieces of user information, the voiceprint certification method comprising:
   receiving first user information among the plurality of pieces of user information;
   selecting at least one first verification word from the plurality of verification words corresponding to the first user information and generating a random verification sentence comprising the at least one first verification word, to prompt a user to read the random verification sentence;
   certifying the user by comparing a user input sentence with the random verification sentence and by determining whether at least one voiceprint corresponding to the at least one first verification word in the user input sentence matches at least one voiceprint of the at least one first verification word corresponding to the first user information recorded in the electronic device;
   obtaining at least one second verification word from the random verification sentence after a successful certification of the user, wherein the at least one second verification word is different from the at least one first verification word; and
   retrieving at least one voiceprint corresponding to the at least one second verification word in the user input sentence, and recording the at least one voiceprint in the electronic device as at least one voiceprint of the at least one second verification word corresponding to the first user information.

2. The voiceprint certification method of claim 1, further comprising:
   randomly generating the plurality of verification words and prompting the user to read the plurality of verification words;
   receiving a plurality of user input words corresponding to the plurality of verification words; and
   retrieving a plurality of voiceprints of the plurality of user input words, and recording the plurality of voiceprints in the electronic device as the plurality of voiceprints of the plurality of verification words corresponding to the first user information.

3. The voiceprint certification method of claim 1, wherein selecting the at least one first verification word from the plurality of verification words corresponding to the first user information and generating the random verification sentence comprising the at least one first verification word, to prompt the user to read the random verification sentence comprises:
   randomly selecting a random number of the at least one first verification word from the plurality of verification words corresponding to the first user information; and
   randomly generating the random verification sentence comprising the at least one first verification word.

4. The voiceprint certification method of claim 1, wherein certifying the user by comparing the user input sentence with the random verification sentence and by determining whether the at least one voiceprint corresponding to the at least one first verification word in the user input sentence matches the at least one voiceprint of the at least one first verification word corresponding to the first user infoi illation recorded in the electronic device comprises:
   determining whether the user input sentence is identical to the random verification sentence word by word;
   determining a failed certification of the user when the user input sentence is determined to be non-identical to the random verification sentence word by word; and
   certifying the user by determining whether the at least one voiceprint corresponding to the at least one first verification word in the user input sentence matches the at least one voiceprint of the at least one first verification word corresponding to the first user information recorded in the electronic device when the user input sentence is determined to be identical to the random verification sentence word by word.

5. The voiceprint certification method voiceprint certification of claim 1, wherein certifying the user by comparing a user input sentence with the random verification sentence and by determining whether the at least one voiceprint corresponding to the at least one first verification word in the user input sentence matches at least one voiceprint of the at least one first verification word corresponding to the first user information recorded in the electronic device comprises:
   determining a failed certification of the user when the at least one voiceprint corresponding to the at least one first verification word in the user input sentence does not match the at least one voiceprint of the at least one first verification word corresponding to the first user information recorded in the electronic device; and
   determining whether the user input sentence is identical to the random verification sentence word by word when the at least one voiceprint corresponding to the at least one first verification word in the user input sentence matches the at least one voiceprint of the at least one first verification word corresponding to the first user information recorded in the electronic device.

6. The voiceprint certification method of claim 4, wherein certifying the user by determining whether the at least one voiceprint corresponding to the at least one first verification word in the user input sentence matches the at least one voiceprint of the at least one first verification word corresponding to the first user information recorded in the electronic device when the user input sentence is determined to be identical to the random verification sentence word by word comprises:
  determining a failed certification of the user when the at least one voiceprint corresponding to the at least one first verification word in the user input sentence does not match the at least one voiceprint of the at least one first verification word corresponding to the first user information recorded in the electronic device; and
  determining the successful certification of the user when the at least one voiceprint corresponding to the at least one first verification word in the user input sentence matches the at least one voiceprint of the at least one first verification word corresponding to the first user information recorded in the electronic device.

7. The voiceprint certification method of claim 5, wherein determining whether the user input sentence is identical to the random verification sentence word by word when the at least one voiceprint corresponding to the at least one first verification word in the user input sentence matches the at least one voiceprint of the at least one first verification word corresponding to the first user information recorded in the electronic device comprises:
  determining a failed certification of the user when the user input sentence is non-identical to the random verification sentence word by word; and
  determining the successful certification of the user when the user input sentence is identical to the random verification sentence word by word.

8. The voiceprint certification method of claim 7, after the successful certification of the user is determined, the voiceprint certification method further comprising:
  obtaining at least one second verification word from the random verification sentence, wherein the at least one second verification word is different from the at least one first verification word;
  retrieving at least one voiceprint corresponding to the at least one second verification word in the user input sentence, and recording the at least one voiceprint in the electronic device as at least one voiceprint of the at least one second verification word corresponding to the first user information.

9. An electronic device comprising:
  a database comprising a memory, configured to record a plurality of pieces of user information and a plurality of voiceprints of a plurality of verification words corresponding to each of the plurality of pieces of user information;
  a communication circuit, configured to communicate with an external device; and
  a hardware processor coupled to the database and the communication circuit, configured to:
    receive first user information among the plurality of pieces of user information from the external device via the communication circuit;
    select at least one first verification word from the plurality of verification words corresponding to the first user information from the database and generate a random verification sentence comprising the at least one first verification word, to prompt a user to read the random verification sentence via the communication circuit;
    certify the user by comparing a user input sentence from the external device with the random verification sentence and by determining whether at least one voiceprint corresponding to the at least one first verification word in the user input sentence matches at least one voiceprint of the at least one first verification word corresponding to the first user information recorded in the database;
    obtain at least one second verification word from the random verification sentence after a successful certification of the user, wherein the at least one second verification word is different from the at least one first verification word; and
    retrieve at least one voiceprint corresponding to the at least one second verification word in the user input sentence, and record the at least one voiceprint in the electronic device as at least one voiceprint of the at least one second verification word corresponding to the first user information.

10. An electronic device, comprising:
  a database comprising a memory, configured to record a plurality of pieces of user information and a plurality of voiceprints of a plurality of verification words corresponding to each of the plurality of pieces of user information;
  an input/output circuit, configured to input and output signals; and
  a hardware processor coupled to the database and the input/output circuit, configured to:
    receive first user information among the plurality of pieces of user information via the input/output circuit;
    select at least one first verification word from the plurality of verification words corresponding to the first user information from the database and generate a random verification sentence comprising the at least one first verification word, to prompt a user to read the random verification sentence via the input/output circuit; and
    certify the user by comparing a user input sentence from the input/output circuit with the random verification sentence and by determining whether at least one voiceprint corresponding to the at least one first verification word in the user input sentence matches at least one voiceprint of the at least one first verification word corresponding to the first user information recorded in the database;
    obtain at least one second verification word from the random verification sentence after a successful certification of the user, wherein the at least one second verification word is different from the at least one first verification word; and
    retrieve at least one voiceprint corresponding to the at least one second verification word in the user input sentence, and record the at least one voiceprint in the electronic device as at least one voiceprint of the at least one second verification word corresponding to the first user information.

* * * * *